United States Patent [19]

Pinkerton et al.

[11] Patent Number: 5,224,979
[45] Date of Patent: Jul. 6, 1993

[54] TOP RELEASE BEARING FOR SHEAR MECHANISM

[75] Inventors: Steven J. Pinkerton, Avon; Douglas W. Wright, Bloomfield, both of Conn.

[73] Assignee: Emhart Glass Machinery Investments Inc., Wilmington, Del.

[21] Appl. No.: 814,122

[22] Filed: Dec. 24, 1991

[51] Int. Cl.⁵ ............................ C03B 7/10; F16B 2/18
[52] U.S. Cl. ........................................ 65/172; 65/334; 83/635
[58] Field of Search ............... 65/332, 334, 167, 171, 65/172; 83/623, 635, 698

[56] References Cited

U.S. PATENT DOCUMENTS

| | | |
|---|---|---|
| 4,174,647 | 11/1979 | Dahms .................... 65/334 |
| 4,214,494 | 7/1980 | Dahms .................... 65/334 |
| 4,214,497 | 7/1980 | Dahms .................... 65/334 |
| 4,246,819 | 1/1981 | Dahms .................... 83/623 |
| 4,699,643 | 10/1987 | Kulig ...................... 65/334 |
| 4,728,354 | 3/1988 | Vilk et al. ............... 83/623 |
| 4,791,845 | 12/1988 | Wright .................... 65/334 |
| 4,924,740 | 5/1990 | Wright .................... 83/623 |

Primary Examiner—W. Gary Jones
Assistant Examiner—Steven P. Griffin
Attorney, Agent, or Firm—Spencer T. Smith

[57] ABSTRACT

A shear mechanism for shearing discrete gobs from at least one runner of molten glass has a shear assembly which is displacable back and forth along a pair of guide rails. The assembly has at least one shear supported on an arm which has a bearing at one side which is operatively associated with one of the guide rails. The support bearing has a lower bearing surface which engages the bottom of the guide rail and an upper bearing surface which supports the top surface and the lower bearing surface can be displaced away from the guide rail by operating a release which is located on the top of the bearing.

2 Claims, 9 Drawing Sheets

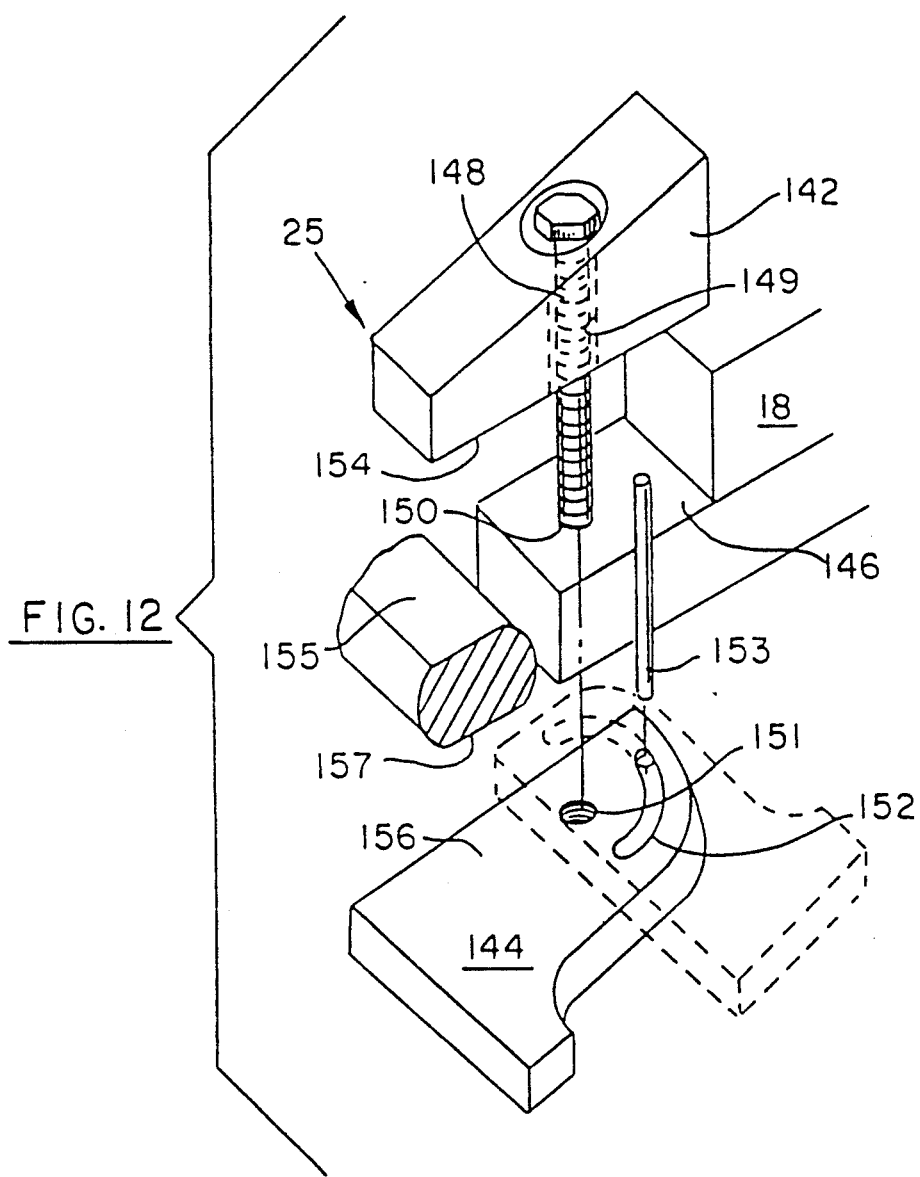

TOP RELEASE BEARING FOR SHEAR MECHANISM

In conventional individual section glass forming machines ware is formed from a discrete gob which is sheared from a runner of molten glass by a pair of reciprocating shears. Molten glass is extremely abrasive and causes shear wear. Periodic maintenance of the shears must accordingly be periodically performed and the inability to quickly remove the shear assembly has made this maintenance very difficult and time consuming.

Conventionally shear assemblies have tubular guide rail supports on one side and a releasable bearing support which must be manipulated both from above and from below on the other. This is very undesirable in a very hot environment where time is money. U.S. Pat. No. 4,214,497 shows such structure.

It is an object of the present invention to provide a quick release support bearing which will enable removal of the shear assembly for repair or replacement.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 12 is an exploded view of the quick release support bearing shown in FIG. 1.

Figure 1:
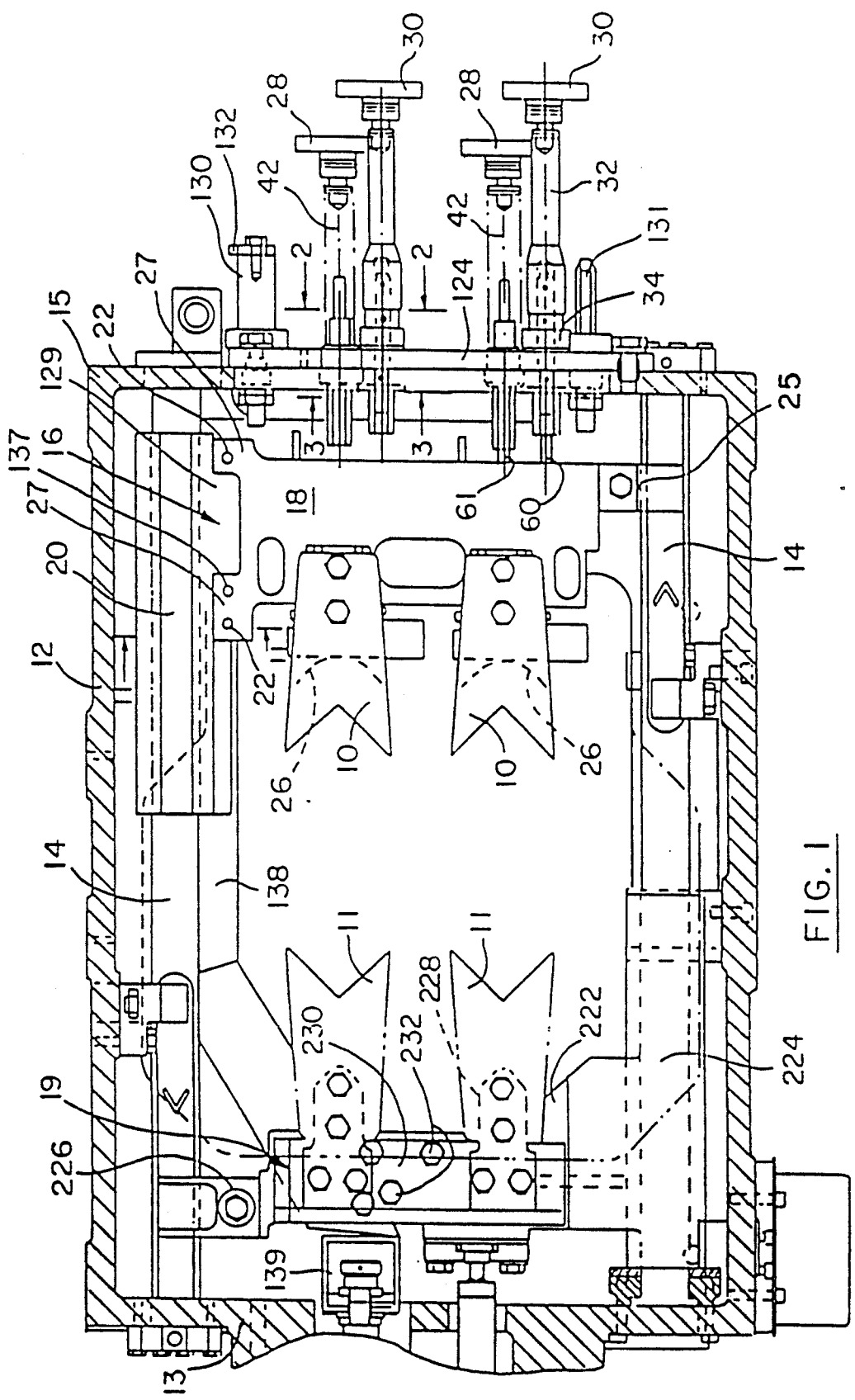
FIG. 1 is a top view of a portion of a shear mechanism made in accordance with the teachings of the present invention.

The shear mechanism has pairs (two in the illustrated embodiment) of opposed upper 10 and lower 11 shears which are supported within a frame 12 for reciprocating displacement. A pair of parallel guide shafts 14 extend along either side of the frame between front 13 and rear 15 walls of the frame and slidably support the upper blade assembly 16 which includes a shear assembly housing 18 and an elongated tubular guide shaft support 20. The shear assembly housing 18 is secured at one side via screws 22 to the elongated tubular guide shaft support 20 and is slidably interconnected with one of the guide shafts 14 by a quick release support bearing 25.

Associated with each upper shear blade 10 is a drop guide 26. The position of each drop guide 26 is independently changeable laterally from side to side (transverse displacement) and forwardly and rearwardly (longitudinal displacement) relative to the shear blade 10. Rotation of the associated longitudinal displacement knob 28 will result in the longitudinal displacement of the drop guide 26 and rotation of an associated transverse displacement knob 30 will result in the transverse displacement of the drop guide. Rotation of the transverse displacement knob 30 rotates a shaft 32 and attached drive gear 34 (FIG. 2) which via an idler 36 rotates a driven gear 38 secured to a drive shaft 39 having a bore 40 which is square in cross section. The longitudinal displacement knob 28 is connected to a drive shaft 42 which also has a square bore 40. A hex surface 44 is defined on the shaft outer diameter which operates together with a spring 46 supported by a block 47 to define a detent to hold the shaft at a desired orientation. Also secured to the frame 12 is a block 50 (FIG. 3) supporting a spring 52 which is operatively associated with an enlarged fine toothed wheel 54 which is secured to the gob guide transverse displacement shaft 32 so that lateral adjustments can be made in fine increments.

Figure 3:
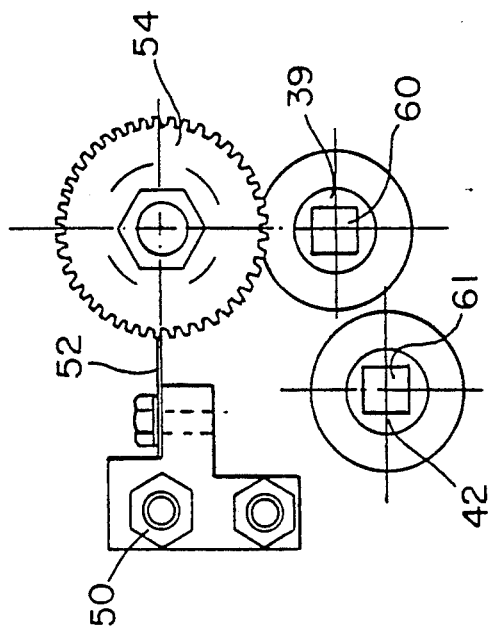
FIG. 3 is a view taken at 3—3 of FIG. 1.
Figure 2:
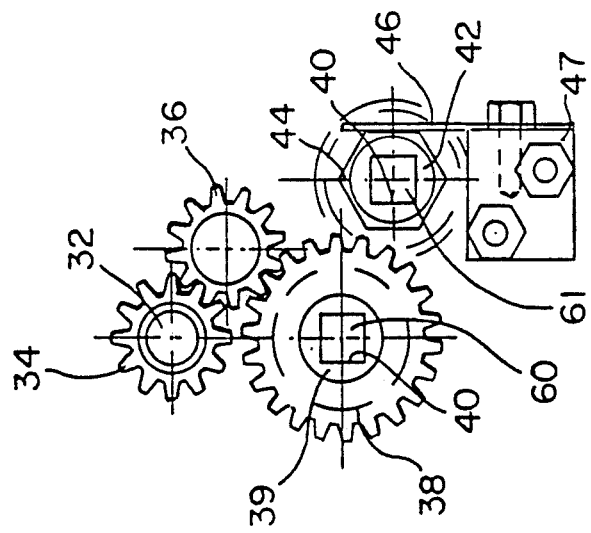
FIG. 2 is a view taken at 2—2 of FIG. 1.

As can be seen from FIGS. 1, 2, 3, each of the drop guide drive shafts 39, 42 receives a driven shaft 60, 61 which extends rearwardly from the shear assembly housing 18 and which has a matching square cross section. The length of both the drive shafts and the driven shafts is selected so that they will be operatively associated throughout the displacement of the shear assembly housing 18.

Figure 4:
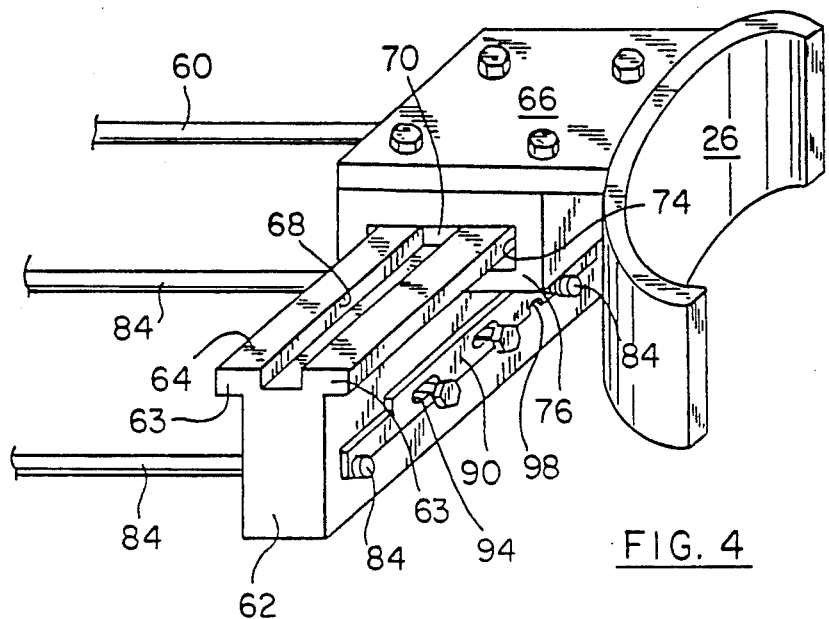
FIG. 4 is an oblique view of a drop guide assembly.
Figure 5:
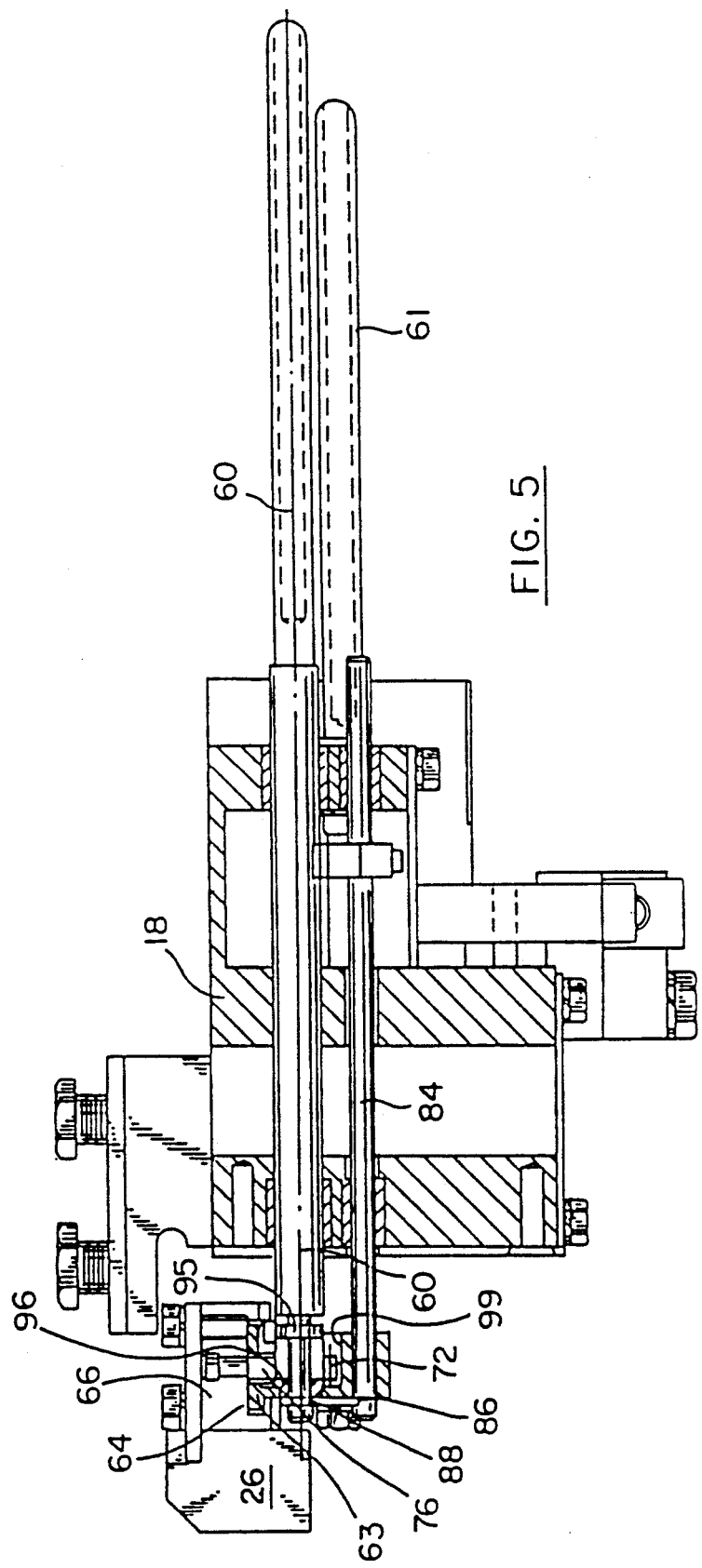
FIG. 5 is a view taken at 5—5 of FIG. 6.

Each drop guide assembly (FIG. 4) includes a base 62 having opposed transverse top flanges 63 which define a slide surface 64 supporting and guiding the lateral displacement of the gob drop guide support block 66 to which the drop guide 26 is secured. The slide includes a lateral groove 68 which receives a rack 70 secured to the bottom of the block 66 and driven by a pinion 72 (FIG. 5) secured to the end of the drop guide transverse displacement driven shaft 60. The block has a laterally extending opening 74 which is partially defined by opposed inwardly extending shelves 76 for capturing the base flanges 63.

Figure 7:
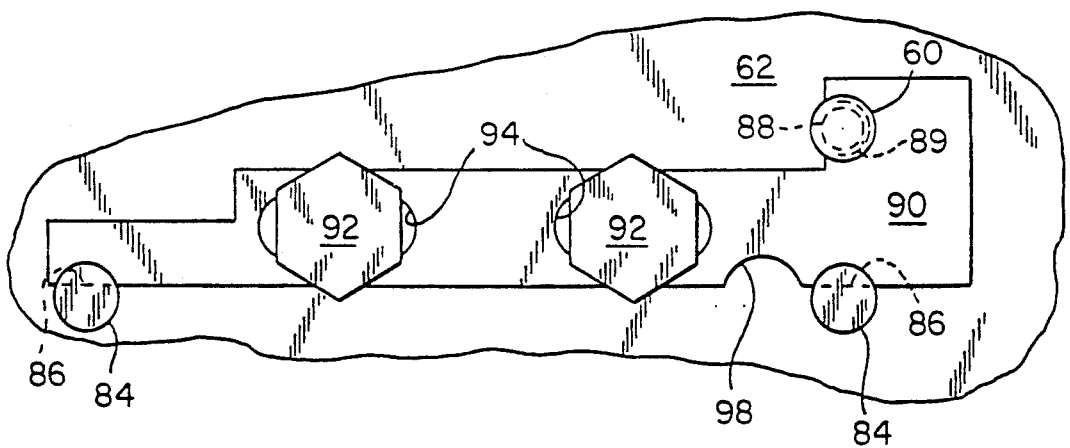
FIG. 7 is a front view of the drop guide connecting plate.
Figure 6:
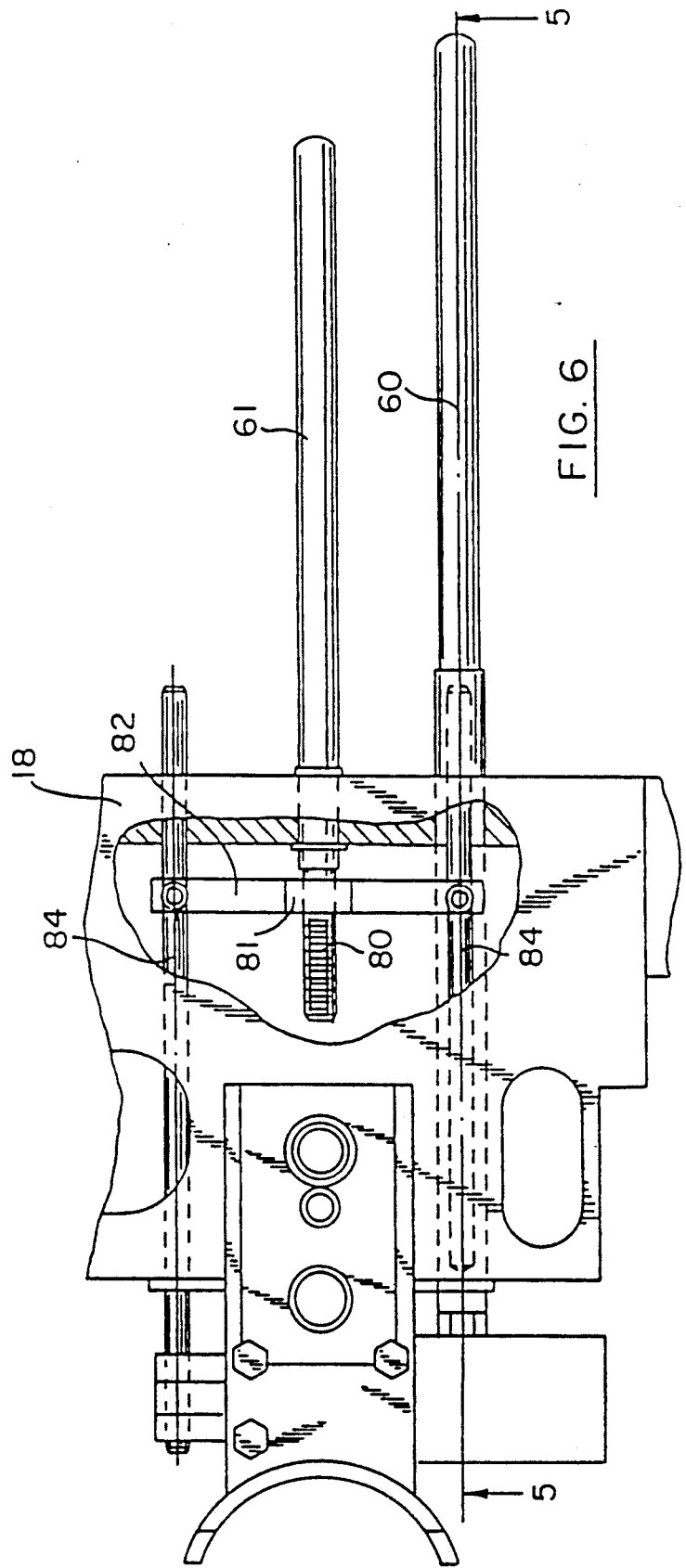
FIG. 6 is an enlarged view of a portion of FIG. 1, with the shear removed.

The front threaded end of the drop guide longitudinal displacement driven shaft 61 (FIG. 6) has a threaded portion 80 which is coupled to a nut 81 carried by cross link 82 which is connected to a pair of rods 84 slidably supported within the shear assembly housing 18 for relative axial displacement. The base 62 of the drop guide is secured to these rods so that rotation of the longitudinal displacement knob 28 will advance or retract the drop guide. A notch 86 is defined near the front end of these rods (FIG. 7) and the front end of the drop guide transverse displacement driven shaft 60 has an annular groove 88 (FIG. 5) which are captured by the bottom surface of the connecting plate 90 and the cut out 89 when the plate is shifted to the latching position shown in FIG. 7. When the connecting plate is released by loosening a pair of screws 92 which pass through enlarged plate holes 94 and which are received by the drop guide base 62 and shifted to the right so that the plate becomes spaced from the lower (as shown in FIG. 7) left rod 84 and so that a large cut out 98 is adjacent and spaced from the lower right (as shown in FIG. 7) rod 84 and the cut out 89 is spaced from the shaft 60, the entire drop guide assembly can be pulled off the three rods and replaced with another assembly. The pinion 72 (FIG. 5) is secured with a screw 95 to the pinion shaft 60 and the front end of the shaft is supported by a bearing 96 which is press fit within a base opening. The rear opening 99 of the base 62 is large enough so that when the base is released it can be completely pulled from the pinion and supporting shaft.

Figure 8:
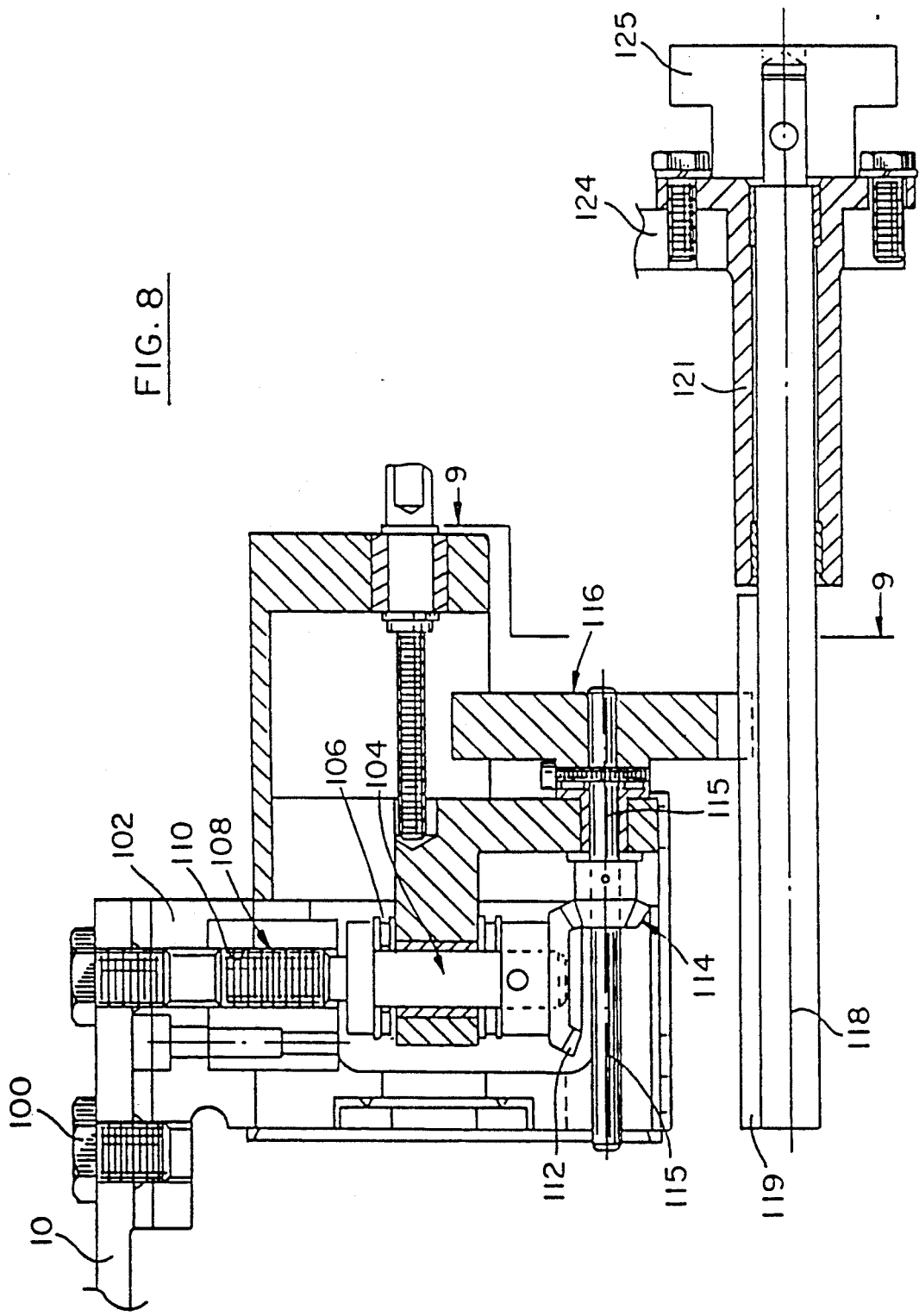
FIG. 8 is an elevational cross sectional view of the tensioning assembly.
Figure 9:
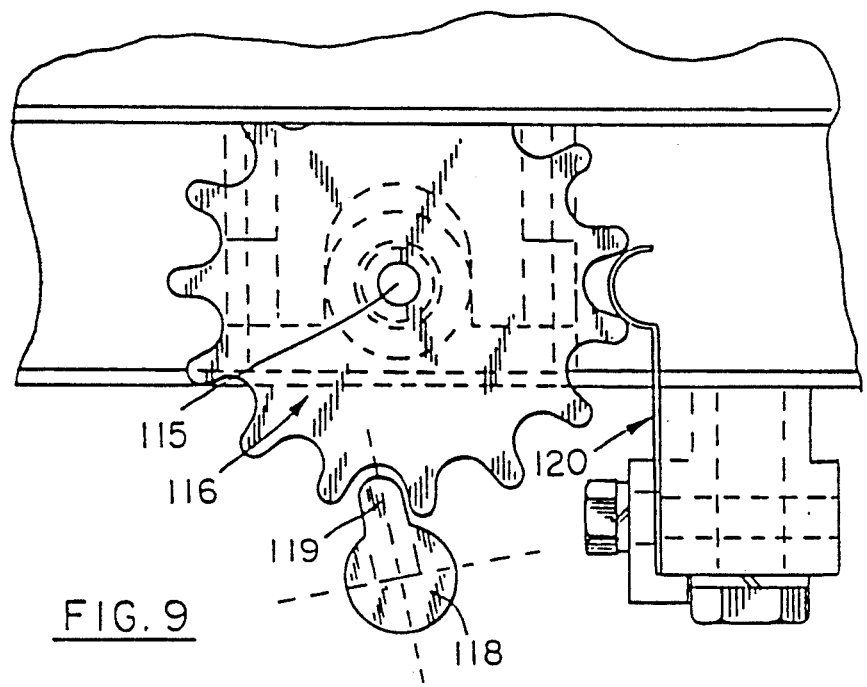
FIG. 9 is a view taken at 9—9 of FIG. 8 showing the indexing wheel operatively associated with an indexing shaft.
Figure 10:
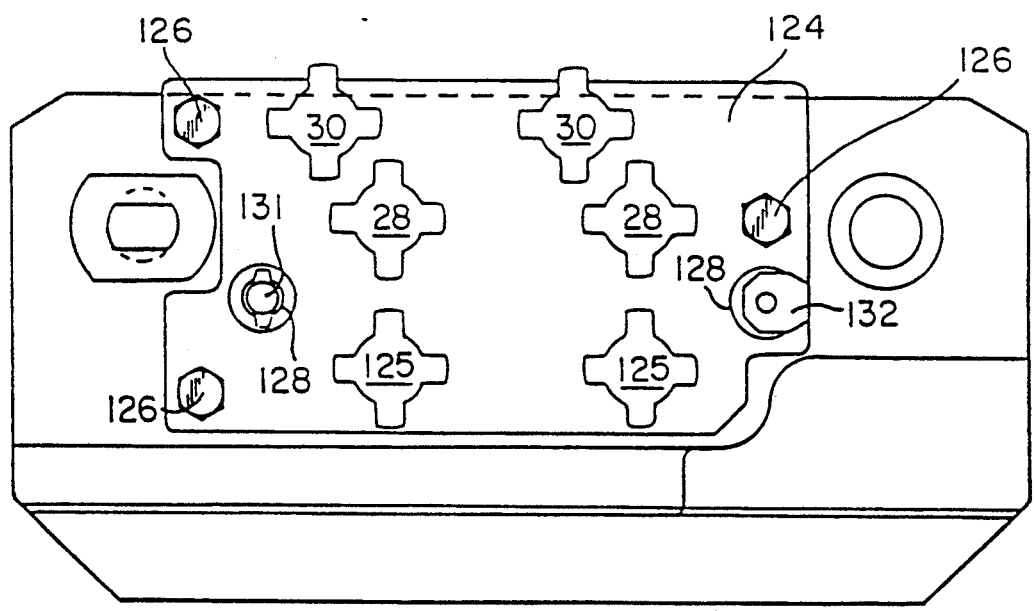
FIG. 10 is an end view of the shear mechanism showing the control knobs.

The shear assembly housing 18 of the upper blade assembly 16 supports a pair of shear blades 10 which are to extend above the lower shear blades 11 of the lower shear blade assembly 19 when the opposed shear blades are conjointly displaced to the advanced position. They are to frictionally engage each other with a selected force or tension and the tensioning assembly is illustrated in FIG. 8. An upper shear blade 10 is secured by screws 100 to a three piece mounting block 102. A control shaft 104 which is rotatably supported within suitable bearings 106 has a threaded portion 108 at one end which is received by a threaded bore 110 in the mounting block 102. Rotation of the control shaft either elevates or lowers the shear blade to control the desired tension between the upper and lower blades. The other end of the control shaft has a bevel gear 112 which is driven by a bevel gear 114 secured to rotatable rod 115. An indexing wheel 116 is also attached to the rod 115. As can be seen from FIG. 9, this indexing wheel 116 will be indexed one pitch each complete revolution of the tensioning drive shaft 118 which has a single tooth 119 and a spring detent 120 will hold the index wheel at any set location. The tensioning drive shaft 118 is rotatably supported by a mounting sleeve 121 secured to the back plate 124 and changes are made by rotating a control knob 125. As can be seen from FIGS. 1, 2, 3, and 10, the control structure, i.e., the structure from the knobs 30, 28 and 125 (since FIG. 1 is a top view knob 28 blocks the view of knob 125) to their drive shafts 39, 42, 118 is mounted on the back plate 124 of the frame 12 which is secured to the frame by a plurality of screws 126. A pair of cylindrical bushings 128 are secured to the back plate for slidably receiving a cylindrical dowel 130 and a diamond pin dowel 131 which are secured to the frame. A removable stop 132 is secured to the end of the cylindrical dowel once the backplate has been placed in position and secured to the frame.

Figure 11:
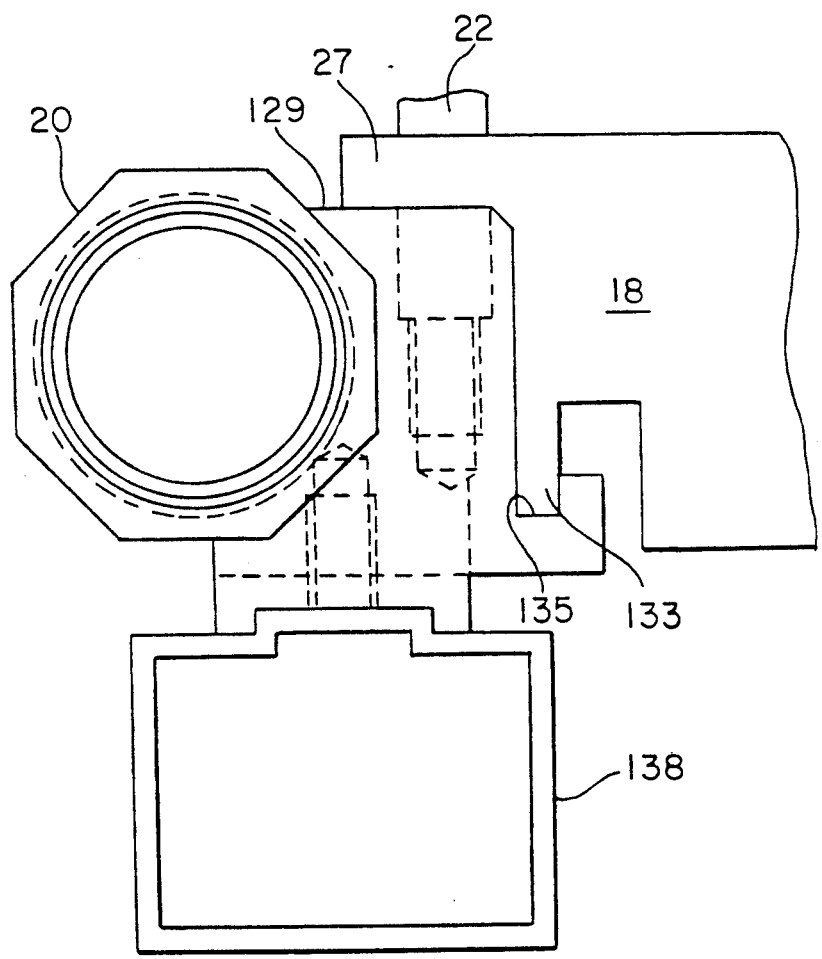
FIG. 11 is a view taken at 11—11 of FIG. 1.

If the shears have to be replaced, the back plate assembly is released and pulled rearwardly until one of the cylindrical bushings 128 engages the stop 132. The upper shear assembly housing is moved forwardly to its advanced position. This relative movement separates the back plate drive shafts 39, 42 from the gob guide driven shafts 60, 61. As shown in FIGS. 1 and 11, the shear assembly housing 18 is supported at one side on top of the elongated tubular drive shaft support 20 (spaced flanges 27 rest on horizontal support surface 129 and a vertical rib 133 is received by a suitable slot 135) and is secured in position by a pair of screws 22 (a dowel 137 is used to assure proper location). The elongated tubular guide shaft support 20 is secured to a frame 138 which is connected to the drive rod 139 (FIG. 1).

The quick release support bearing 25 (FIG. 12) has an upper finger 142 and a lower finger 144. The upper finger is supported on the top surface of a flange 146 having top and bottom surfaces defined on the shear assembly housing 18 and is not free to rotate. A screw 148 passes through enlarged holes 149, 150 in the upper finger and the shelf and threadedly engages a threaded bore 151 in the lower finger 144. The lower finger has an arcuate slot 152 which corresponds to a segment of a circle extending about 90° having a center coincident with the axis of the threaded bore 151 and a pin 153 secured to the shelf extends vertically downwardly parallel to the screw 148 into this slot. When a mechanic loosens the screw 148, the lower finger 144 will rotate counterclockwise until the pin 153 engages one end of the slot 152. At this position the lower finger 144 will. be rotated 90° clear of the guide shaft 14 (the lower finger will be at the shaft release position) and the shear assembly housing 18 can be removed. When another shear assembly housing is placed in position and the screw 148 is tightened, the lower finger 144 will rotate clockwise until the pin 153 hits the other end of the slot 152 locating the lower finger in the support (operative) position. Further tightening of the screw will clamp the fingers to the arm defining a bearing surface between the horizontal flat bottom surface 154 of the upper finger and the horizontal flat upper surface 155 of the guide shaft 14 and between the top flat horizontal surface 156 on the lower finger and the flat horizontal bottom surface 157 of the guide shaft.

The lower blade assembly 19 has an arm 222 including an elongated tubular portion 224 for slidably receiving one of the guide shafts 14 and a support bearing 226 to guide the other guide shaft 14. Blade mounting blocks 228 are secured to a mounting plate 230 which is secured to the arm by a pair of screws 232 and a pair of lower shear blades 11 are secured to these blocks.

To change the configuration of the machine from double gob to triple gob, for example, the mounting plate screws 232 of the lower shear assembly are removed. The mounting plate assembly is replaced with a mounting plate assembly having three blades. (Screw receiving holes are provided in the arm to receive the mounting plate screws of each mounting plate assembly.) Additionally, the upper shear blade housing and back plate assembly are removed and replaced with a shear blade housing and back plate assembly having the desired configuration.

We claim:

1. A shear mechanism for shearing discrete gobs from at least one runner of molten glass comprising
   a frame including a front wall and a rear wall,
   a pair of parallel guide shafts secured to and extending between said walls, one of said guide shafts having horizontal flat upper and lower surfaces,
   a shear assembly including
      a housing for supporting at least one shear,
      said housing including a flange having top and bottom surfaces,
      an upper finger supported on the top surface of said flange and including bearing surface means operatively associated with the horizontal flat upper surface of said one shaft,
      means for preventing the rotation of said upper finger,
      a lower finger including a portion located beneath said flange and including bearing surface means operatively associated with the horizontal flat bottom surface of said shaft,
      a screw, accessible from the top of said housing extending through said flange and interconnecting said upper and lower fingers and
      means for interconnecting said lower finger and said flange so that the loosening of said screw will rotate said lower finger from an operative position slidably supporting said shaft to a shaft release position.

2. A shear mechanism according to claim 1, wherein said means for interconnecting said lower finger and said flange includes
   an arcuate slot, coaxial with the axis of said screw, defined in the top of said lower finger and
   vertical pin means secured to said flange and projecting downwardly into said slot,
   said slot extending about 90°.

* * * * *